United States Patent
Frank et al.

(10) Patent No.: US 8,531,080 B2
(45) Date of Patent: Sep. 10, 2013

(54) ROTOR HAVING A SUPERCONDUCTING ROTOR WINDING AND AN INTEGRAL SLEEVE SURROUNDING THE ROTOR WINDING

(75) Inventors: Michael Frank, Uttenreuth (DE); Sven Gattermann, Zirndorf (DE); Peter Van Hasselt, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 262 days.

(21) Appl. No.: 12/737,609

(22) PCT Filed: Jul. 14, 2009

(86) PCT No.: PCT/EP2009/058949
§ 371 (c)(1),
(2), (4) Date: Jan. 28, 2011

(87) PCT Pub. No.: WO2010/012583
PCT Pub. Date: Feb. 4, 2010

(65) Prior Publication Data
US 2011/0127874 A1    Jun. 2, 2011

(30) Foreign Application Priority Data
Jul. 29, 2008   (DE) .......................... 10 2008 035 275

(51) Int. Cl.
*H02K 1/30* (2006.01)
*H02K 1/22* (2006.01)
(52) U.S. Cl.
CPC .......................................... *H02K 1/30* (2013.01)
USPC ..................... 310/261.1; 310/52; 310/156.12; 310/270; 310/272
(58) Field of Classification Search
CPC .................................. H02K 3/522; H02K 1/30
USPC ............. 310/52, 156.12–15, 261.1, 270, 272, 310/194
IPC ................................................. H02K 1/22, 3/46
See application file for complete search history.

(56) References Cited

U.S. PATENT DOCUMENTS

| 3,194,655 A | * | 7/1965 | Pels Alan R et al. | .......... 420/492 |
| 3,969,156 A | * | 7/1976 | Wallbaum | ..................... 148/536 |

(Continued)

FOREIGN PATENT DOCUMENTS

| DE | 103 00 269 | 7/2004 |
| DE | 10 2008 035 275.6 | 7/2008 |
| JP | 7-42534 | 2/1995 |

OTHER PUBLICATIONS

K. Kapoor et al., "X-ray diffraction line profile analysis for defect study in Cu-1 wt.% Cr-0.1 wt.% Zr alloy", Materials Characterization, vol. 54, 2005, pp. 131-140.

(Continued)

*Primary Examiner* — John K Kim
(74) *Attorney, Agent, or Firm* — Staas & Halsey LLP

(57) ABSTRACT

A rotor for a synchronous machine has a rotor axis which defines a rotor shaft. The rotor has a winding support which is arranged on the rotor shaft such that they rotate together, in such a way that it surrounds the rotor shaft in a center section with respect to the rotor axis. The winding support is fitted with a superconducting rotor winding. The rotor has a sleeve which at least radially surrounds the winding support and the rotor winding with respect to the rotor axis. The sleeve is formed integrally from a metal alloy, which is non-magnetic, has an electrical conductivity of at least 60% of the electrical conductivity of copper at 20° C., has a mechanical tensile strength of at least 250 N/mm² at 200° C. and has a 0.2% proof stress of at least 200 N/mm² at 200° C.

8 Claims, 2 Drawing Sheets

(56) References Cited

U.S. PATENT DOCUMENTS

| | | |
|---|---|---|
| 4,224,066 A | 9/1980 | Watson et al. |
| 4,329,602 A | 5/1982 | Gillet |
| 4,465,106 A | 8/1984 | Hooper |
| 4,642,495 A * | 2/1987 | Mori et al. ............. 310/52 |
| 4,679,314 A * | 7/1987 | Lenz et al. ............. 29/598 |
| 4,692,644 A * | 9/1987 | Lenz et al. ............. 310/178 |
| 4,820,945 A * | 4/1989 | Khutoretsky et al. ........ 310/52 |
| 5,020,411 A * | 6/1991 | Rowan ............. 89/1.11 |
| 6,794,792 B2 * | 9/2004 | Wang ............. 310/270 |
| 7,049,717 B2 * | 5/2006 | Frank et al. ............. 310/61 |
| 2002/0171325 A1 * | 11/2002 | Wang et al. ............. 310/270 |
| 2003/0052568 A1 | 3/2003 | Howard |
| 2004/0210289 A1 * | 10/2004 | Wang et al. ............. 607/116 |
| 2011/0127874 A1 * | 6/2011 | Frank et al. ............. 310/194 |

OTHER PUBLICATIONS

Korean Office Action issued Apr. 24, 2012 in corresponding Korean Patent Application No. 10-2011-7004408.

International Search Report for Application No. PCT/EP2009/058949; mailed Feb. 18, 2010.

* cited by examiner

ROTOR HAVING A SUPERCONDUCTING ROTOR WINDING AND AN INTEGRAL SLEEVE SURROUNDING THE ROTOR WINDING

CROSS REFERENCE TO RELATED APPLICATIONS

This application is the U.S. national stage of International Application No. PCT/EP2009/058949, filed Jul. 14, 2009, and claims the benefit thereof. The International Application claims the benefits of German Application No. 10 2008 035 275.6, filed Jul. 29, 2008, both applications are incorporated by reference herein in their entirety.

BACKGROUND

The embodiments discussed herein relate to a rotor for an electrical machine, in particular a synchronous machine,
  wherein the rotor has a rotor shaft defining a rotor axis,
  wherein the rotor has a winding support, which is arranged fixed against rotation on the rotor shaft, with the result that it surrounds the rotor shaft in a central section, in relation to the rotor axis,
  wherein the winding support supports a superconducting rotor winding,
  wherein the rotor has a sleeve, which surrounds the winding support and the rotor winding at least radially, in relation to the rotor axis.

The embodiments discussed herein furthermore relate to an electrical machine, in particular a synchronous machine,
  wherein the electrical machine has a machine housing,
  wherein such a rotor is mounted rotatably in the machine housing,
  wherein a stator, which surrounds the rotor radially, in relation to the rotor axis, is arranged fixed against rotation in the machine housing,
  wherein the stator supports a stator winding, which can be connected to a voltage supply.

Such a rotor and such an electrical machine are known, for example, from DE 103 00 269 A1.

The sleeve is required, both in the prior art and in the embodiments, in order to be able to cool the superconducting rotor winding to a sufficient extent and to shield it thermally with respect to the surrounding environment. The sleeve needs to have high mechanical strength in order to be able to absorb the mechanical loads occurring during operation. Furthermore, the sleeve needs to have high electrical conductivity in order to absorb unavoidable electromagnetic harmonics.

In DE 103 00 269 A1, the sleeve is formed with two layers. It consists, at least in the region in which it surrounds the winding support and the superconducting rotor winding radially, a radially inner layer consisting of steel and a radially outer layer consisting of copper.

The design of the rotor is complex in DE 103 00 269 A1. Either a steel tube and a copper tube with a very precise fit need to be manufactured or two plates of copper and steel are connected to one another and bent back to form a tube, with the abutting edge being welded. Both procedures are complex and expensive. Furthermore, the welded seam represents a weak point in the construction.

U.S. Pat. No. 4,465,106 A has likewise disclosed a rotor for an electrical machine in which the winding support is surrounded by a multilayered sleeve. The multilayered sleeve has a central layer which consists of a copper/chromium or a copper/zirconium alloy. It is surrounded radially on both sides by iron-containing layers.

U.S. Pat. No. 3,194,655 A has disclosed a copper/chromium/zirconium alloy which has a relatively high material strength. The alloy consists of from 0.6 to 0.9 percent by weight of chromium, from 0.4 to 0.6 percent by weight of zirconium and the remainder copper.

SUMMARY

The object of the embodiments include configuring a rotor of the type mentioned at the outset in such a way that the sleeve can be produced more easily in terms of manufacturing technology, at least in the region of said sleeve which surrounds the winding support and the winding radially.

The object is achieved by a rotor as discussed herein. According to the embodiments, the sleeve includes integrally of a copper alloy, in which low quantities of chromium (up to 2 percent by weight) and zirconium (from 0.1 to 0.3 percent by weight) are admixed to the copper, at least in the region in which it surrounds the winding support and the superconducting rotor winding radially (lateral surface of the sleeve).

The object is furthermore achieved by an electrical machine, in particular a synchronous machine, in which the rotor is designed corresponding to the above-mentioned configuration.

Particularly good results have been produced when the chromium content is at least 0.5 percent by weight. An optimum is in the range of from 0.8 percent by weight to 1.2 percent by weight for chromium and from 0.2 percent by weight to 0.3 percent by weight for zirconium.

In addition to the use of one of the abovementioned copper alloys, it is possible for the copper alloy to be a solidified copper alloy. Suitable solidified copper alloys here are in particular a precipitation-hardened copper alloy and an oxide dispersion-hardened copper alloy. As an alternative or in addition, the copper alloy could be work-hardened and/or solid-solution-strengthened.

Owing to the circumstance that the lateral surface of the sleeve is integral, it is in particular possible for the lateral surface to be in the form of a seamless tube. There is therefore no axially running welded seam.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
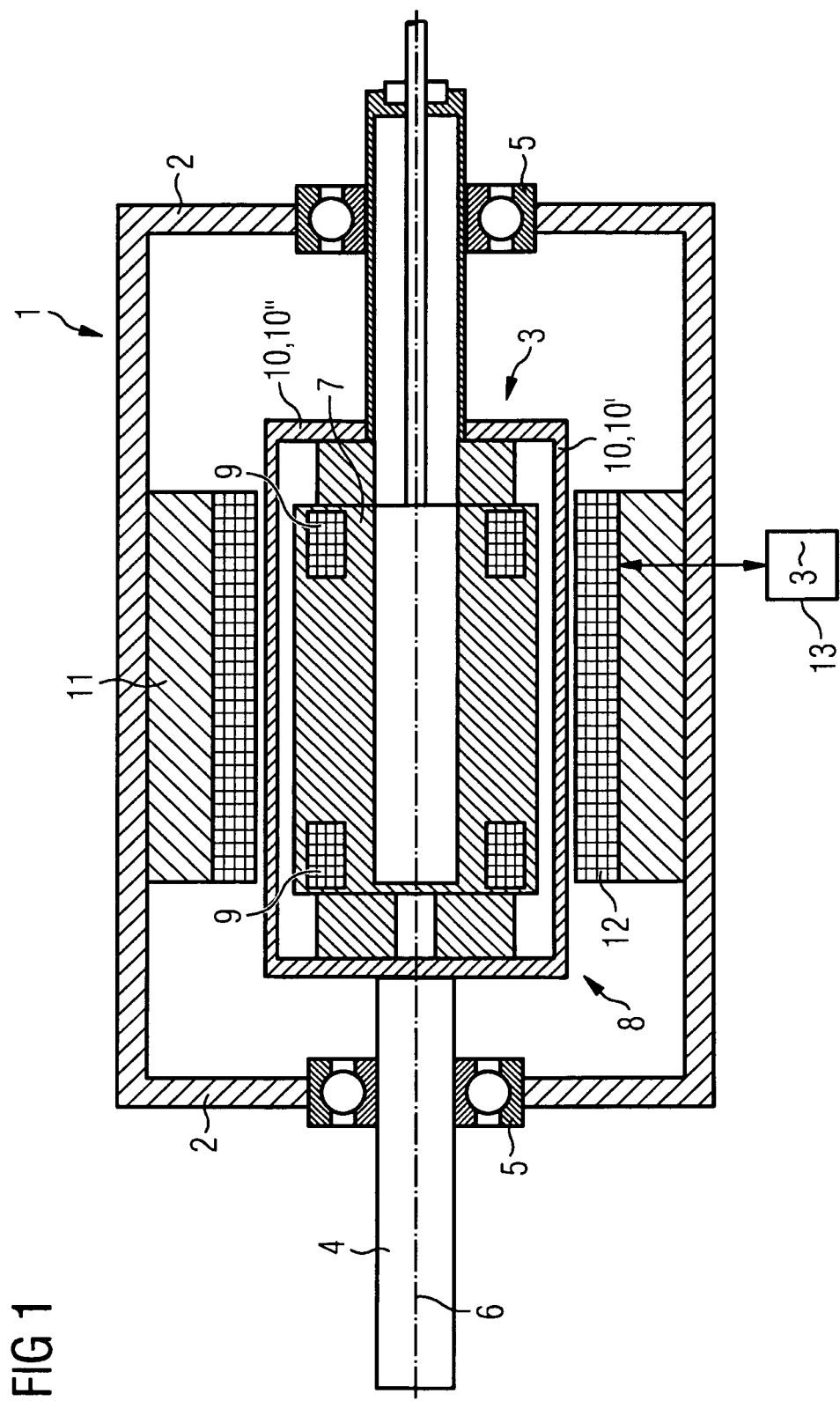
FIG. 1 shows a section through an electrical machine.

Reference will now be made in detail to the preferred embodiments, examples of which are illustrated in the accompanying drawings, wherein like reference numerals refer to like elements throughout.

As shown in FIG. 1, an electrical machine 1 has a machine housing 2. A rotor 3 is mounted in the machine housing 2. The rotor 3 has a rotor shaft 4, which it mounted in bearings 5 of the electrical machine 1. The bearings 5 are in this case generally in the form of roller bearings. As a special configuration of roller bearings, ball bearings are illustrated in FIG. 1. The bearings 5 could alternatively also be other types of roller bearings, however, for example cylindrical bearings. It would also be possible to provide a plain bearing arrangement or a contactless bearing arrangement (magnetic bearings or the like).

The rotor shaft 4 defines a rotor axis 6. The rotor 3 is capable of rotating about the rotor axis 6.

Insofar as the terms "axial", "radial" and "tangential" are used below, they always refer to the rotor axis 6. The term "axial" in this case means a direction parallel to the rotor axis 6. The directions "radial" and "tangential" run in a plane orthogonal to the rotor axis 6. "Radial" in this case denotes a direction towards the rotor axis 6 or away from the rotor axis 6. "Tangential" is a direction around the rotor axis 6.

The rotor 3 has a winding support 7. The winding support 7 is arranged fixed against rotation on the rotor shaft 4. The winding support 7 surrounds the rotor shaft 4 in a central section 8. The winding support 7 therefore runs tangentially around the rotor shaft 4 at a radial distance.

The winding support 7 supports a rotor winding 9. In this case, the rotor winding 9 is superconducting.

Furthermore, the rotor 3 has a sleeve 10. The sleeve 10 surrounds the winding support 7 and the superconducting rotor winding 9 both radially and axially, as shown in FIG. 1. A region 10' in which the sleeve 10 surrounds the winding support 7 and the superconducting rotor winding 9 radially is referred to below as the lateral surface 10' of the sleeve 10. Regions 10" in which the sleeve 10 surrounds the winding support 7 and the rotor winding 9 axially are referred to below as end faces 10" of the sleeve 10.

In accordance with the configuration shown in FIG. 1, both the lateral surface 10' and the end faces 10" are provided. However, other configurations are also possible. At least the lateral surface 10' is always provided, however.

A stator 11 is arranged fixed against rotation in the machine housing 2. The stator 11 surrounds the rotor 3 radially. The stator 11 supports a stator winding 12. The stator winding 12 can be connected to a voltage supply 13. The voltage supply 13 is generally in the form of a three-phase AC voltage supply, corresponding to the illustration in FIG. 1. Corresponding thereto, the electrical machine 1 is therefore generally a three-phase AC machine. For example, the electrical machine can be in the form of a synchronous machine.

Figure 2:
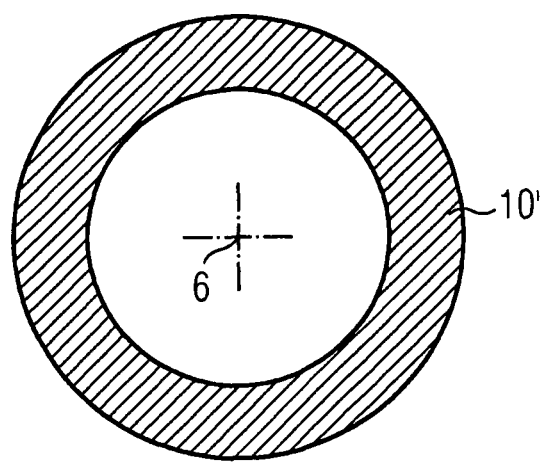
FIG. 2 shows a section through a lateral surface of a sleeve according to the embodiments.
Figure 3:
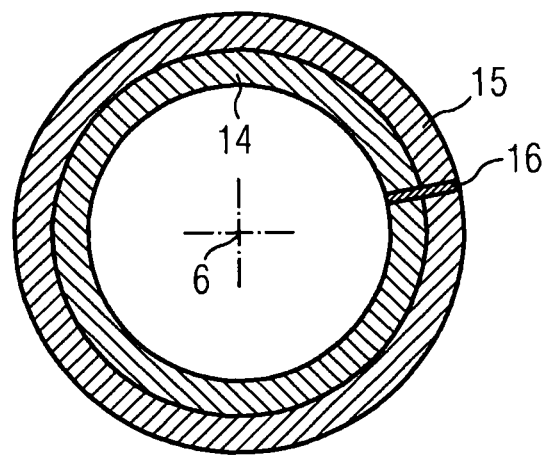
FIG. 3 shows a section through a lateral surface of a sleeve from the prior art.

The lateral surface 10' is arranged radially between the stator 11, on the one hand, and the winding support 7 and the rotor winding 9, on the other hand, as shown in FIG. 1. In particular, the lateral surface 10' firstly needs to be mechanically stable and secondly needs to have high electrical conductivity. According to the embodiments, the lateral surface 10' (see also FIG. 2) consists integrally of a metal alloy. This configuration differs from the prior art, in which (see FIG. 3) the lateral surface 10' has at least two layers, for example in accordance with the teaching of DE 103 00 269 A1 has an inner layer 14 consisting of steel and an outer layer 15 consisting of copper. Owing to the integral design of the lateral surface 10', it is furthermore possible for the lateral surface 10' to be in particular in the form of a seamless tube, as shown in FIG. 2 (see FIG. 2). This configuration also differs from the prior art, in which a welded seam 16 is generally provided.

The metal alloy used for the lateral surface 10' (and also preferably for the end faces 10") is selected such that it has the following material properties:

It is nonmagnetic, i.e. it is diamagnetic or paramagnetic, but not ferromagnetic.

It has (at 20° C.) an electrical conductivity which is at least 60% of the electrical conductivity of copper (likewise at 20° C.). It is preferred here if the electrical conductivity is from 70 to 90% of the conductivity of copper. The metal alloy is generally a copper alloy.

The metal alloy has (at 200° C.) a mechanical tensile strength of at least 250 N/mm2. Preferably, the mechanical tensile strength is even at least 280 N/mm2.

The metal alloy has (likewise at 200° C.) a 0.2% proof stress of at least 200 N/mm2. Preferably, the metal alloy even has a 0.2% proof stress of at least 220 N/mm2.

In order to achieve the mechanical strength (i.e. the required tensile strength and the required proof stress), the metal alloy needs to be selected in suitable fashion. In particular, copper alloys in which chromium and zirconium are admixed to the copper are options. The copper alloy can in this case contain up to 2.0 percent by weight of chromium and up to 0.3 percent by weight of zirconium. The lower limits are 0.0 percent by weight for chromium and 0.1 percent by weight for zirconium.

Furthermore, the metal alloy can be a hardened metal alloy. In order to harden the metal alloy, in particular precipitation hardening and oxide dispersion hardening are options. The two measures can also be combined with one another. In addition, and in specific cases also as an alternative, work-hardening and solid solution strengthening are options.

If the copper alloy contains chromium, it preferably contains at least 0.5 percent by weight of chromium, in particular between 0.8 percent by weight and 1.2% by weight. The zirconium content is preferably between 0.2 percent by weight and 0.3 percent by weight. It is particularly preferred if the copper alloy contains both chromium and zirconium, to be precise in the abovementioned preferred quantities. With such copper alloys, it is possible to achieve a mechanical tensile strength of at least 300 N/mm2 and a 0.2% proof stress of at least 230 N/mm2 at temperatures of up to far beyond 200° C. The electrical conductivity of this alloy reaches up to 85% of the electrical conductivity of copper.

The above description is used exclusively for explaining the embodiments. The scope of protection of the embodiments should be defined exclusively by the attached claims, however.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV,* 358 F3d 870, 69 USPQ2d 1865 (Fed. Cir. 2004).

The invention claimed is:

1. A rotor for an electrical machine, in particular a synchronous machine, comprising:

a rotor shaft defining a rotor axis, a rotor winding support, which is arranged fixed against rotation on the rotor shaft, with the result that it surrounds the rotor shaft in a central section, in relation to the rotor axis, a superconducting rotor winding which is supported by the winding support, and a solid metal sleeve, which surrounds the winding support and the rotor winding at least radially, in relation to the rotor axis, with a radial gap between the sleeve and the rotor winding and the rotor winding support, where the sleeve comprises integrally of a copper alloy which contains a maximum of 2.0 percent by weight of chromium, at least 0.1 and at most 0.5 percent by weight of zirconium and the remainder copper, at least in the region in which it surrounds the winding support and the superconducting rotor winding radially comprising a lateral surface of the sleeve.

2. The rotor as claimed in claim 1, wherein the copper alloy contains at least 0.5 percent by weight of chromium.

3. The rotor as claimed in claim 1, wherein the copper alloy is a solidified metal alloy.

4. The rotor as claimed in claim 3, wherein the solidified copper alloy is a precipitation-hardened copper alloy.

5. The rotor as claimed in claim 3, wherein the solidified copper alloy is an oxide dispersion-hardened copper alloy.

6. The rotor as claimed in claim 1, wherein the lateral surface is in the form of a seamless tube.

7. An electrical machine, in particular a synchronous machine, comprising:
   a machine housing,
   a rotor as claimed claim 1 is mounted rotatably in the machine housing,
   a stator, which surrounds the rotor radially, in relation to the rotor axis, is arranged fixed against rotation in the machine housing, and
   a stator winding, which is supported by the stator and can be connected to a voltage supply.

8. A sleeve for a rotor of an electrical machine, comprising integrally of a copper alloy which contains a maximum of 2.0 percent by weight of chromium, at least 0.1 and at most 0.5 percent by weight of zirconium and the remainder copper, at least in the region in which it surrounds the winding support and the superconducting rotor winding radially comprising a lateral surface of the sleeve.

* * * * *

UNITED STATES PATENT AND TRADEMARK OFFICE
CERTIFICATE OF CORRECTION

PATENT NO. : 8,531,080 B2
APPLICATION NO. : 12/737609
DATED : September 10, 2013
INVENTOR(S) : Michael Frank et al.

Page 1 of 1

It is certified that error appears in the above-identified patent and that said Letters Patent is hereby corrected as shown below:

In the Claims

In Column 5, Line 17, In Claim 7, after "claimed" insert -- in --.

Signed and Sealed this
Twenty-fourth Day of December, 2013

Margaret A. Focarino
*Commissioner for Patents of the United States Patent and Trademark Office*